United States Patent [19]

Masakawa

[11] 4,444,807
[45] Apr. 24, 1984

[54] METHOD FOR TREATING A SURFACE OF A POLYESTER FILM

[75] Inventor: Yoshihiko Masakawa, Tokyo, Japan

[73] Assignee: Olympus Optical Co., Ltd., Tokyo, Japan

[21] Appl. No.: 518,207

[22] Filed: Jul. 28, 1983

[30] Foreign Application Priority Data

Aug. 4, 1982 [JP] Japan .................... 57-136024

[51] Int. Cl.³ ........................ B05D 5/12; B05D 3/02
[52] U.S. Cl. ............................. 427/129; 427/132; 427/316; 427/444
[58] Field of Search ............... 427/129, 132, 316, 444

Primary Examiner—Bernard D. Pianalto
Attorney, Agent, or Firm—Frishauf, Holtz, Goodman & Woodward

[57] ABSTRACT

A surface of the thermoplastic polyester film which has stickiness after having been heated is treated with a monocarboxylic acid so as to convert hydroxyl groups on the film surface into corresponding ester groups by reaction with the acid. Further, the film surface is treated with a monohydric alcohol so as to convert carboxyl groups on the film surface into corresponding ester groups by reaction with the alcohol. Thus, the stickiness on the film surface is eliminated.

13 Claims, 2 Drawing Figures

METHOD FOR TREATING A SURFACE OF A POLYESTER FILM

BACKGROUND OF THE INVENTION

1. Field of the Invention

The present invention relates to a surface treatment method for a polyester film and, more particularly, to a method for treating a surface of a polyester film to eliminate stickiness on the surface of a polyester film which exhibits such stickiness after having been heated.

2. Description of the Prior Art

A polyester film, that is, a thermoplastic polyester film, a typical example of which is a polyethylene terephthalate film, is widely adopted as base film for magnetic tape. In the manufacture of such magnetic tape, a metallic thin film (magnetic material) is formed on one surface of a polyester film by vapor deposition, sputtering or the like. Due to the heat applied during formation of such a metallic thin film, the other surface of the polyester film on which the metallic thin film is not formed is rendered sticky. One of the important properties of magnetic tape is good travel characteristics. However, when the surface of such a polyester film as a base film becomes sticky, the coefficient of friction increases to significantly impair the travel characteristics of the tape.

It has been conventionally proposed to apply a coating agent such as a polymeric material so as to eliminate such stickiness on the surface of a polyester film due to having undergone heating.

When a magnetic tape having a film of a coating agent on its rear surface is assembled in a tape cassette and is made to travel, it is brought into constant contact with pads of the tape cassette, causing the problem of peel-off (dusting) of the film. Magnetic tape from which the film has become peeled off cannot travel stably.

SUMMARY OF THE INVENTION

It is an object of the present invention to provide a surface treatment method for eliminating stickiness on a surface of a thermoplastic polyester film which has been heated without causing the conventional problem of peel-off of a coating film.

It is another object of the present invention to provide a method for manufacturing a magnetic tape having as a base film a thermoplastic polyester film which has significantly reduced stickiness.

The reason why the surface of a polyester film which has been heated becomes sticky is attributed to the heat involved in heating. The oligomer present in the polyester film, such as

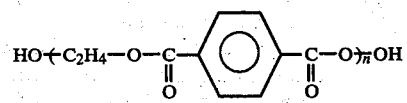

and nonreacted monomers and the like are transferred to the surface of the film, so that the carboxyl groups and hydroxyl groups included in such an oligomer, nonreacted monomer and the like are exposed to the surface of the film. In addition to this, the carboxyl group or the hydroxyl group at the terminal end of the polyester molecule are considered to contribute to imparting stickiness to the surface of the film.

The present inventor has made extensive studies based on the above. As a result of such studies, the present inventor has found that stickiness on the surface of a polyester film may be eliminated by esterification of the above-mentioned carboxyl group and hydroxide group. The present invention has thus been established based on this finding.

In order to achieve the above objects of the present invention, monocarboxylic acid is brought into contact with a sticky surface of a thermoplastic polyester film at a temperature not more than about 150° C. but sufficient to cause a reaction thereof with the hydroxyl group on the surface of the polyester film. In addition, monohydric alcohol is brought into contact with the surface of the polyester film at a temperature not more than about 150° C. but sufficient to cause a reaction thereof with the carboxyl group on the surface of the polyester film. Thus, the hydroxyl group and the carboxyl group are both converted into the corresponding ester groups, thereby substantially eliminating stickiness on the surface of the polyester film.

DETAILED DESCRIPTION OF THE PREFERRED EMBODIMENTS

Figure 1:
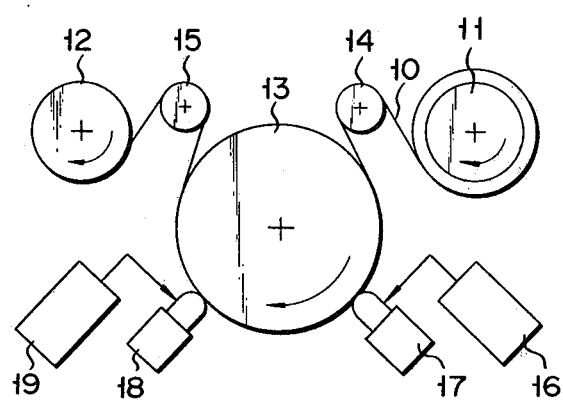
FIGS. 1 and 2 are schematic views showing different apparatuses which can be suitably used in practicing the method of the present invention.

As described hereinabove, when a thermoplastic polyester film such as a polyethylene terephthalate film used as a base film of magnetic tape is heated, an oligomer as described above, nonreacted monomers (e.g., ethylene glycol, terephthalic acid, and the like) which remain in a small amount and the like are transferred to the surface of the polyester film. Then, the carboxyl groups and hydroxyl groups included in these materials are exposed at the surface of the film. The carboxyl groups and hydroxyl groups at the terminal ends of the polyester molecules are also exposed at the surface of the film. Due to the presence of these groups, the polyester film is rendered sticky. The term "heated" as used herein includes the case where the polyester film is "heated" (in general, to 100° C. to 150° C., or more, locally) when a magnetic metal thin film (e.g., cobalt-nickel alloy) is formed on the polyester film by vapor deposition, ion-plating, sputtering or the like. The methods for forming such a magnetic metal thin film are well known to those skilled in the art.

A preferable monocarboxylic acid to be used in the present invention is a saturated lower aliphatic monocarboxylic acid having the formula:

$$R^1COOH$$

(where $R^1$ is a hydrogen atom or a lower alkyl group). If $R^1$ is a lower alkyl group, it preferably has up to 4 or 5 carbon atoms. Particularly preferred examples of the monocarboxylic acid include formic acid, acetic acid, and propionic acid, with acetic acid being most preferable. A saturated monocarboxylic acid selected from those enumerated above may be diluted with water or the like.

The reaction temperature and time for bringing the saturated monocarboxylic acid into reaction with the hydroxyl groups on the surface of the film can be suitably determined depending upon the type of carboxylic acid used. Residual nonreacted carboxylic acid can be removed either by direct evaporation or by evaporation as an ester with monohydric alcohol to be described later. For this reason, the reaction temperature is preferably above the boiling point of the carboxylic acid in the former case, and is above the boiling point of one of the monohydric alcohol and the ester thereof with the carboxylic acid which has a higher boiling point in the latter case. Esters of methanol or ethanol with formic acid or acetic acid have a lower boiling point than that of the corresponding methanol or ethanol. The upper limit of the reaction temperature is about 150° C. If the reaction temperature exceeds about 150° C., the oligomer, the nonreacted monomer and the like as described above are further transferred to the surface of the film.

An ester group produced by reaction with a monocarboxylic acid is, for example, expressed by:

$$-OOCR^1$$

The preferred monohydric alcohol to be used in the present invention is a monohydric alkanol. The monohydric alkanol has a formula $R^2$-OH wherein $R^2$ is an alkyl group preferably having up to 4 or 5 carbon atoms. Particularly preferred examples of the monohydric alkanol include methanol, ethanol and propanol, with ethanol being the most preferred.

The reaction temperature and time for bringing the alcohol into contact with a polyester film to react with the carboxyl groups at the surface thereof can also be determined depending upon the type of alcohol used. For the same reason as described with reference to the carboxylic acid, the reaction temperature of the alcohol is preferably above the boiling point of one (in general, the alcohol) of the alcohol used and the ester thereof with the carboxylic acid used which has a higher boiling point. The upper limit of the reaction temperature is 150° C. for the same reason as described with reference to the carboxylic acid.

An ester group produced by a reaction with the alcohol may be expressed, for example, by the following formula:

$$-COOR^2$$

The sequence of bringing the reactants (a carboxylic acid and an alcohol) into contact with the sticky surface of the polyester film is not particularly limited. However, it is preferred to first bring acetic acid or the like into contact with the film surface and then to bring ethanol or the like into contact with the film surface.

In order to prepare magnetic tape according to the method of the present invention, a magnetic metallic thin film is formed at an elevated temperature on one major surface of a polyester film using a known vacuum deposition technique such as vapor deposition, ion-plating, sputtering or the like. The other major surface of the polyester film is subjected to the treating method according to the present invention mentioned hereinabove.

FIG. 1 schematically shows a first example of an apparatus for practicing the present invention. The apparatus has a supply roller 11, a heated roller 13, and a takeup roller 12 of a polyester film. A polyester film 10 having a magnetic thin film (not shown) on its one surface and which has a sticky other surface is fed from the supply roller 11. The polyester film 10 thus supplied having the sticky surface facing outward is brought into contact with the heated roller 13 heated to a predetermined temperature above the boiling point of an ethanol (and, in general, up to 80° C.), for example, through an auxiliary roller 14, and is made to travel. Then, acetic acid is applied to the sticky surface of the film 10 by a suitable applicator 17 connected to an acetic acid source 16. An applicator 18 connected to an ethanol source 19 is located at a predetermined distance from the applicator 17 and applies ethanol to the surface of the film 10. The surface-treated polyester film 10 then travels for a further predetermined distance on the heated roller 13, and is taken up on the takeup roller 12 through another auxiliary roller 15.

Figure 2:
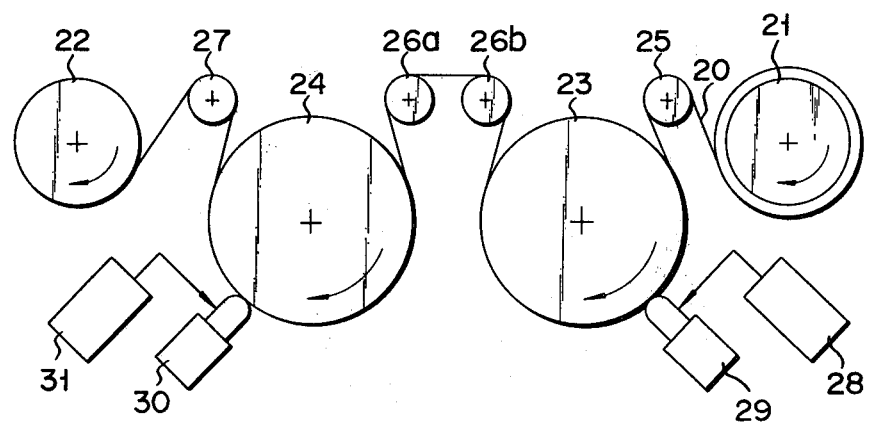

FIG. 2 schematically shows a second example of an apparatus which has two heated rollers 23 and 24. In this case, the temperatures at which a carboxylic acid and an alcohol are respectively applied, that is, the temperatures of the heated rollers 23 and 24, may be set separately. A polyester film 20 supplied from a supply roller 21 is made to travel on the first heated roller 23 through an auxiliary roller 25. Acetic acid, for example, supplied from a source 28 is applied by an applicator 29 to the sticky surface of the polyester film 20 travelling on the heated roller 23. The film 20 to which acetic acid has been applied then travels further on the heated roller 23 to reach the second heated roller 24 through two auxiliary rollers 26. Then, ethanol, for example, from a source 31 is applied by an applicator 30 to the surface of the polyester film 20 on the heated roller 24. Thereafter, the film 20 travels a further predetermined distance on the heated roller 24, and is taken up by a takeup roller 22 through an auxiliary roller 27.

In each of the apparatuses as described above, in order to remove water temporarily adhered to the polyester film surface, at least the heated roller at which acetic acid is applied is preferably heated to a temperature of 100° C. or higher. The temporarily adhered water may delay the initiation of the reaction. In an experiment wherein application of acetic acid was performed at a temperature of 110° C. or more, stickiness of the polyester film was significantly reduced.

EXAMPLE

Using the apparatus shown in FIG. 1, the sticky surface of a polyethylene terephthalate film having a magnetic thin film deposited thereon was surface-treated to obtain a desired magnetic tape. The carboxylic acid used was acetic acid which was diluted to 1N to 5N. The alcohol used was ethanol. The film was supplied at a rate of 1.5 to 3 m/min, and the heated roller was maintained at a temperature within the range of 90° to 125° C. When the temperature of the heated roller was set to be below the boiling point of acetic acid, excess acetic acid was reacted with an excess amount of the ethanol applied later so that it could be evaporated in the form of ethyl acetate. The heated roller had a diameter of 20 cm, and the circumferential distance of the heated roller between the point of acetic acid application and the point of ethanol application was 5 to 20 cm. After application of the ethanol, the polyester film travelled further on the heated roller for a distance of 10 to 15 cm. The surface thus treated exhibited a coefficient $\mu$ of friction of 0.35±0.05, whereas the surface immediately before the surface treatment exhibited that of 0.6±0.1. The surface of the raw polyester film exhibited a coefficient $\mu$ of 0.35±0.05.

The surface of the polyester film which was surface-treated in this manner was substantially free of stickiness.

According to the method of the present invention, stickiness on the surface of a polyester film can be easily eliminated by sequentially bringing into contact therewith a carboxylic acid and an alcohol. The carboxylic acid and alcohol react with the hydroxyl and carboxyl groups on the surface of the polyester film to form an ester which constitutes part of the film. Thus, the conventional problem of separation of a film of a coating agent is completely prevented. By the method of the present invention, stickiness on the surface of a polyester film or the like is eliminated, and the coefficient of friction is reduced. Accordingly, the method of the present invention is suitable for surface treatment of a polyester film as a base film of magnetic tape which must have excellent travel characteristics.

What is claimed is:

1. A surface treatment method for a thermoplastic polyester film, comprising:
   bringing a monocarboxylic acid into contact with a surface of a thermoplastic polyester film which is sticky after having been heated and then contains hydroxy groups and carboxyl groups on said surface, at a temperature not more than about 150° C. but sufficient to cause a reaction thereof with said hydroxyl groups on the surface of said polyester film, so as to convert the hydroxyl groups into corresponding ester groups; and
   bringing a monohydric alcohol into contact with the surface of said polyester film which is sticky, at a temperature not more than about 150° C. but sufficient to cause a reaction thereof with carboxyl groups on the surface of said polyester film, so as to convert the carboxyl groups into corresponding ester groups; thereby substantially eliminating the stickiness on the surface of said polyester film.

2. A method according to claim 1, wherein the monocarboxylic acid is a saturated lower aliphatic carboxylic acid having a formula:

$$R^1-COOH$$

where $R^1$ is hydrogen atom an alkyl group having not more than 5 carbon atoms.

3. A method according to claim 1, wherein the monocarboxylic acid is a member selected from the group consisting of formic acid, acetic acid and propionic acid.

4. A method according to claim 1, wherein the monocarboxylic acid is acetic acid.

5. A method according to claim 1, wherein the monohydric alcohol is a lower alkanol having not more than 5 carbon atoms.

6. A method according to claim 1, wherein the monohydric alcohol is a member selected from the group consisting of methanol and ethanol.

7. A method according to claim 1, wherein the monohydric alcohol is ethanol.

8. A method according to claim 1, wherein said polyester film is guided onto a heated roller maintained at a temperature higher than the boiling temperature of the monohydric alcohol, and the surface of said polyester film on said heated roller which is sticky is sequentially brought into contact with the monocarboxylic acid and the monohydric alcohol.

9. A method according to claim 1, wherein said polyester film is guided onto a first heated roller maintained at a first predetermined temperature and the surface of said polyester film on said first heated roller which is sticky is brought into contact with the monocarboxylic acid, and said polyester film is then guided onto a second heated roller maintained at a second predetermined temperature and the surface of said polyester film on said second heated roller which is sticky is brought into contact with the monohydric alcohol.

10. A method for manufacturing a magnetic tape, comprising:
    providing a thermoplastic polyester film having first and second major surfaces;
    forming a magnetic thin film on said first major surface of said polyester film at an elevated temperature;
    bringing a saturated lower aliphatic monocarboxylic acid into contact with said second major surface which contains hydroxyl groups including hydroxyl groups caused to be present thereon as a result of said formation of said magnetic film, at a temperature of not higher than 150° C. and under conditions to cause reaction thereof with said hydroxyl groups, so as to convert the hydroxyl groups into corresponding ester groups; and
    bringing a lower alkanol into contact with said second major surface which contains carboxyl groups including carboxyl groups caused to be present thereon as a result of said formation of said magentic film, at a temperature of not higher than 150° C. and under conditions to cause reaction thereof with said carboxyl groups, so as to convert the carboxyl groups into corresponding ester groups.

11. A method according to claim 10, wherein the monocarboxylic acid is acetic acid, and the alkanol is ethanol.

12. A method according to claim 10, wherein said polyester film is guided onto a heated roller maintained at a temperature higher than the boiling point of the alkanol such that said first major surface faces said heated roller, and said second major surface of said polyester film is sequentially brought into contact with the monocarboxylic acid and the alkanol.

13. A method according to claim 10, wherein said polyester film is guided onto a first heated roller maintained at a first predetermined temperature such that said first major surface faces said first heated roller and said second major surface of said polyester film on said first heated roller is brought into contact with the monocarboxylic acid, and said polyester film is then guided onto a second heated roller maintained at a second predetermined temperature such that said first major surface faces said second heated roller and said second major surface of said polyester film on said second heated roller is brought into contact with the alkanol.

* * * * *